United States Patent [19]
Novak

[11] 3,939,539
[45] Feb. 24, 1976

[54] CUTTING TOOL HOLDER

[75] Inventor: Arne Novak, Sollentuna, Sweden
[73] Assignee: Wlajko Mihic, Gavle, Sweden

[22] Filed: Apr. 2, 1975
[21] Appl. No.: 564,396

[30] Foreign Application Priority Data
Apr. 8, 1974 Sweden .......................... 74047184

[52] U.S. Cl. .................................................. 29/96
[51] Int. Cl.² .......................................... B26D 1/00
[58] Field of Search ................................ 29/95, 96

[56] References Cited
UNITED STATES PATENTS

| | | | |
|---|---|---|---|
| 2,737,705 | 3/1956 | Novkov | 29/96 |
| 3,124,864 | 3/1964 | Frommdt et al. | 29/96 |
| 3,518,737 | 7/1970 | Hood | 29/96 |
| 3,557,417 | 1/1971 | Kollar | 29/96 |
| 3,693,224 | 9/1972 | Bartoszevicz | 29/96 |

*Primary Examiner*—Harrison L. Hinson
*Attorney, Agent, or Firm*—Sughrue, Rothwell, Mion, Zinn & Macpeak

[57] ABSTRACT

A holder body 10 has an extension 11 whose upper surface is provided with a V-shaped groove 12 which accommodates a cutting bit insert 15 and a clamp member 18, both having complimentary V-shaped bottoms. The rear edge of the insert abuts a stop pin 19 and the nose 20 of the clamp member bears against a recess 17 in the insert. The clamp member is secured to the body by a double threaded screw 22.

8 Claims, 6 Drawing Figures

CUTTING TOOL HOLDER

BACKGROUND OF THE INVENTION

1. Field of the Invention

This invention relates to a cutting tool holder comprising a holder body, a cutting bit insert and a clamping device.

2. Description of the Prior Art

Holders with a short V-shaped seat for the cutting bit insert, which is formed with a corresponding bottom-surface, have previously been manufactured. The seat terminates at a transverse rear shoulder which the insert abuts. From this shoulder one part extends backwards to the holder body, which part is intended to support the clamping means and has a plane bottom surface. The manufacture of such a holder involves great problems since the V-shaped slot is shaped by a circular mill whose cutting surface, without contacting the shoulder, must cut away all of the material up to the shoulder. With these holders there is also a risk that the clamping means may move sideways and in time loosen its grasp on the insert. These holders also have an opening between the rear end of the clamping device and the holder body which results in abrasive dirt and chips accumulating in the tool.

SUMMARY OF THE INVENTION

These drawbacks are eliminated by this invention whereby a rigid and reliable clamping of the cutting bit insert is achieved while at the same time the manufacture of the holder body and the clamping means has been simplified.

DESCRIPTION OF THE PREFERRED EMBODIMENT

Figure 1:
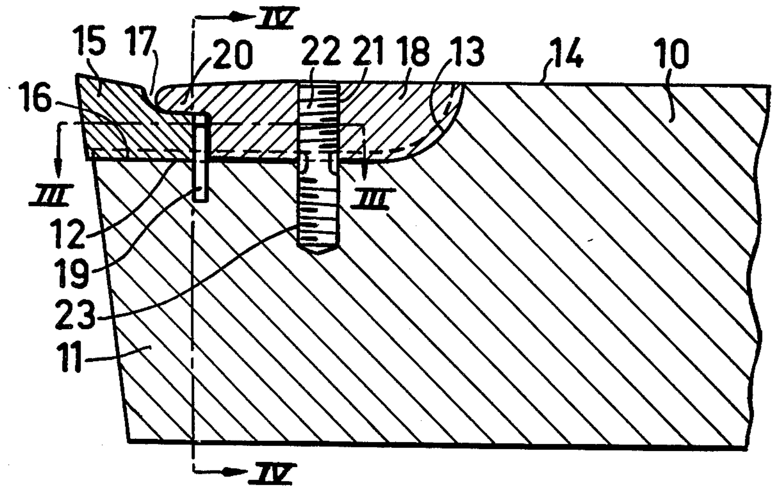
FIG. 1 shows a vertical section through a holder according to the invention.
Figure 2:
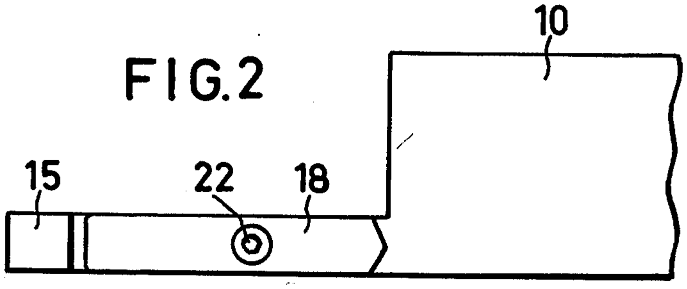
FIG. 2 shows a horizontal plan view of the holder.

As shown in FIGS. 1 and 2 the holder comprises a holder body 10 with an extending narrow part 11. The upper surface of the narrow part is shaped as a seat 12 having a V-shaped groove which in the front part of the seat is horizontal but at the rear end via a curved part 13 ends in the upper horizontal surface 14 of the holder body. The front part of the seat receives a cutting bit insert 15 which is correspondingly shaped with a profiled bottom surface 16 to lie firm against the surfaces of the groove, and with a recess 17 which is abutted by a clamping means 18. The movement of the insert in the backwards direction is limited by a pin 19 inserted into a bore in the groove. The clamping means is in its front part formed with a nose 20 which rests in the recess 17 while the bottom surface has a shape which corresponds to the rear part of the groove, whereby the clamping means in its rear part is rounded and has an acute profile when seen in section.

Figure 3:
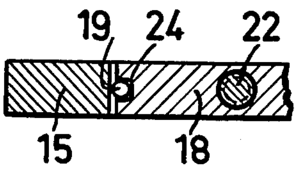
FIG. 3 shows a section along the line III—III in FIG. 1.
Figure 4:
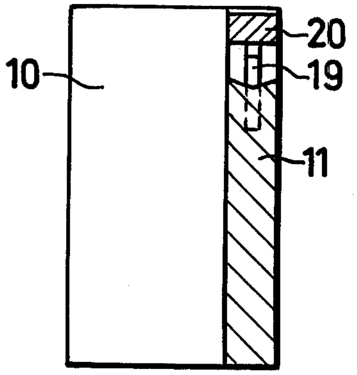
FIG. 4 shows a section along the line IV—IV in FIG. 1, and FIGS. 5 and 6 show other embodiments of the invention.

Near the middle of the clamping means is a threaded bore 21, a double threaded screw 22, and a threaded bore 23 in the groove, by which the clamping means is secured to the holder body. The double threaded screw has an upper part which is right-hand threaded and a lower part which is left-hand threaded, resulting in that the clamping means can be rapidly fastened and loosened to change the insert. The clamping means has in its front part below the nose 20 a vertical slot 24 (FIG. 3) wherein the pin 19 lies when the clamping means is fastened. The pin thus serves as a steering means for the vertical movement of the clamping means when changing the insert.

This arrangement provides for the safe and simple fastening of the insert, and it is simple to manufacture since the V-shaped groove can be easily cut out with a circular mill whereby this groove serves as a centering means for both the insert and the clamping means.

Figure 5:
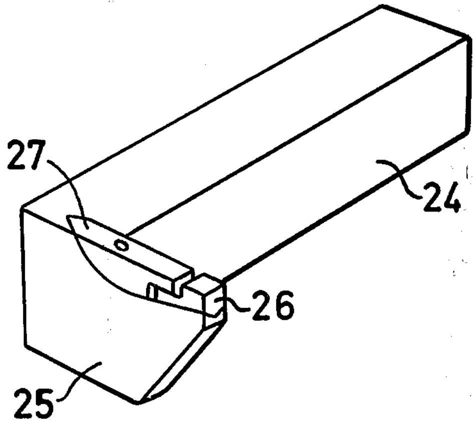

The embodiment shown in FIG. 5 comprises a holder body 24 with an extending narrow part 25 supporting an insert 26 and a clamping means 27. The longitudinal direction of the extending part is perpendicular to the longitudinal direction of the holder body whereby the tool can be used to make holes in workpieces.

Figure 6:
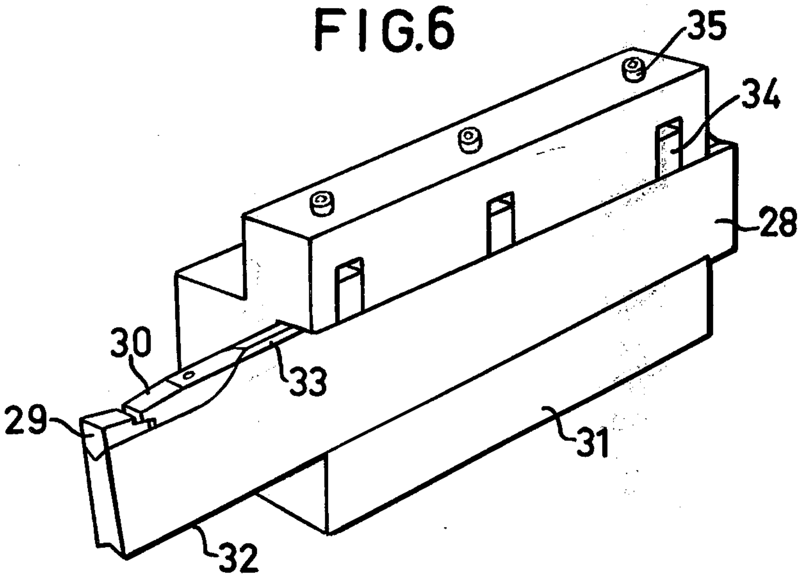

The embodiment shown in FIG. 6 comprises a holder body 28 having an insert 29 and clamping means 30. The width of the holder body is of the same size as the insert. The holder body can be moved in its longitudinal direction in a support device 31 and has a lower surface 32 and an upper surface 33 both having V-shaped grooves. The holder body can be clamped to the support device 31 by sliding means 34 with a shape corresponding to the upper surface 33 of the holder body by means of screws 35. By this arrangement different types of workpieces can be cut-off with the same tool.

It is also possible to avoid using a pin to take up the forces transferred to the insert. Instead, the clamping means can serve the same purpose. Also, the axes of the bores 21 and 23 need not be perpendicular to the surface of the seat but can be angled or offset so that the rear part of the clamping means will abut the seat before the nose abuts the insert thus ensuring that there will be no risk of sideways movements of the clamping means during the last portion of the fastening movement.

What is claimed is:

1. A cutting tool holder including a holder body, a changeable cutting bit insert and a clamping means, the holder body having a generally horizontal, slender, section-profiled seat whose upper surface is below the upper surface of the holder body and intended to support the insert in its front part while the rear part supports the clamping means, characterized by: the part (13) connecting said upper surface of the seat with the upper surface (14) of the holder body having the same profiled shape as the horizontal part of the seat, and the clamping means having a shape corresponding to the seat and the connecting part.

2. A cutting tool holder according to claim 1 characterized in that the seat and the connecting part have a V-shaped profile, and the connecting part is a curved surface.

3. A cutting tool holder according to claim 1 characterized by the seat having an extending pin (19) placed behind the insert and intended to serve as a stop member for the insert.

4. A cutting tool holder according to claim 1 characterized in that the clamping means is fastened to the seat by a double-threaded screw.

5. A cutting tool holder according to claim 1 characterized in that the clamping means has a nose (20) in its front part adopted to rest in a recess (17) in the insert.

6. A cutting tool holder according to claim 3 characterized in that the bottom surface of the clamping means has a recess (24) receiving the pin, whereby the pin serves as an aligning device for the clamping means when fastened.

7. A cutting tool holder according to claim 1 characterized in that the longitudinal direction of the seat is perpendicular to the longitudinal direction of the holder body.

8. A cutting tool holder according to claim 1 characterized in that the holder body has substantially the same width as the insert and can be clamped in different extending positions in a support device.

* * * * *